(12) United States Patent
Beach et al.

(10) Patent No.: US 7,347,808 B2
(45) Date of Patent: Mar. 25, 2008

(54) POLYURETHANE ROLLS AND METHODS OF MANUFACTURING

(75) Inventors: Bradley L. Beach, Lexington, KY (US); Bhaskar Gopalanarayanan, Lexington, KY (US); Johnny D. Massie, II, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/755,904

(22) Filed: Jan. 13, 2004

(65) Prior Publication Data

US 2005/0154149 A1 Jul. 14, 2005

(51) Int. Cl.
*G03G 15/04* (2006.01)

(52) U.S. Cl. .......................... 492/56; 264/82; 264/294; 264/331.11; 264/331.19; 525/440; 525/452; 525/455; 525/477; 525/63; 525/66; 528/25; 528/61; 528/66

(58) Field of Classification Search .................. 528/60, 528/61, 85; 492/56
See application file for complete search history.

(56) References Cited

U.S. PATENT DOCUMENTS

| | | | |
|---|---|---|---|
| 3,823,201 A | 7/1974 | Pizzini et al. | |
| 4,210,727 A | 7/1980 | Preston et al. | |
| 4,258,148 A | 3/1981 | Chandalia et al. | |
| 4,359,542 A | 11/1982 | Chandalia et al. | |
| 4,359,571 A | 11/1982 | Bernstein et al. | |
| 4,504,313 A * | 3/1985 | Robertson ................... | 106/38.2 |
| 4,521,546 A | 6/1985 | O'Connor et al. | |
| 5,021,506 A | 6/1991 | Gastinger et al. | |
| 5,070,141 A | 12/1991 | Gastinger et al. | |
| 5,223,570 A | 6/1993 | Huang et al. | |
| 5,250,581 A | 10/1993 | Gastinger et al. | |
| 5,262,486 A | 11/1993 | Telser et al. | |
| 5,733,973 A | 3/1998 | Wamprecht et al. | |
| 5,810,705 A | 9/1998 | Mimura et al. | |
| 5,843,577 A | 12/1998 | Ouhadi et al. | |
| 5,874,172 A * | 2/1999 | Beach et al. .............. | 428/423.1 |
| 5,925,893 A | 7/1999 | Ishii et al. | |
| 6,011,090 A | 1/2000 | Sakogawa et al. | |
| 6,035,172 A | 3/2000 | Mimura et al. | |
| 6,142,922 A | 11/2000 | Yoshikawa et al. | |
| 6,265,457 B1 | 7/2001 | Dolgopolsky et al. | |
| 6,352,771 B1 * | 3/2002 | Chiang et al. .............. | 428/364 |
| 6,414,081 B1 | 7/2002 | Ouhadi | |
| 6,489,382 B1 | 12/2002 | Giesecke et al. | |
| 6,515,077 B1 | 2/2003 | Su et al. | |

OTHER PUBLICATIONS

U.S. Appl. No. 10/756,494, filed Jan. 13, 2004, Killeen et al.
U.S. Appl. No. 10/756,009, filed Jan. 13, 2004, Beach et al.
U.S. Appl. No. 10/756,220, filed Jan. 13, 2004, Gopalanarayanan et al.
Polyurethanes with Polybutyl Acrylate Grafts Via Macromonomer Technique: Thermal and Mechanical Properties; P. Radhakrishnan Nair, C. P. Reghunadhan Nair and D. J. Francis; Eur. Polym. J. vol. 33, No. 1, pp. 89-95, 1997; Copyright ©1996 Elsevier Science Ltd; Printed in Great Britain.

* cited by examiner

*Primary Examiner*—Marc S. Zimmer
(74) *Attorney, Agent, or Firm*—Dinsmore & Shohl LLP

(57) ABSTRACT

Rolls having a polyurethane elastomer formed from a polyurethane mixture, wherein the polyurethane mixture comprises polydiene, tri-functional polyol curative, an additional graft polymer curative having a molecular weight of at least about 800 and comprising diol, polyol, diamine, polyamine or a combination thereof, conductive modifier, antioxidant, and hydrolytic stabilizer. Methods of forming such rolls include casting the polyurethane mixture, followed by curing, then demolding, grinding to desired dimensions and baking such that the outer layer of the cured roll is oxidized.

24 Claims, No Drawings

POLYURETHANE ROLLS AND METHODS OF MANUFACTURING

FIELD OF THE INVENTION

The present invention relates to rolls suitable for use, for example, in image forming devices, including electrophotographic print applications, and to methods for manufacturing such rolls. In particular, the invention relates to rolls comprising polyurethane elastomer which exhibit desirable combinations of physical properties.

BACKGROUND OF THE INVENTION

Wide availability, relative inexpense, and functional versatility have led to the adaptation and use of polyurethane elastomers with specific physical properties in a diverse array of technical applications. One such application is as conductive and semi-conductive members in image forming devices, such as electrophotographic printers. As printer art evolved according to the motivation of increased office space efficiency in light of ergonomic considerations, the need has arisen to develop more compact image forming devices having a smaller device footprint. As a consequence, there is a need for reduced-geometry elastomeric printer components. However, the necessary size adaptations alter the functioning of components with respect to, for example, required compressive forces, nip widths, low compression set, low hardness, triboelectric charging capacity, and rotational torque. Utilization of reduced-geometry components having the same properties as the originally-sized components results in the occurrence of unacceptable print variations and distortions in the final printed product.

In electrophotographic printer applications, a developer roll typically functions to provide a layer of toner to a charged photoconducting drum. The toner is metered onto the surface of the developer roll via a doctor blade. The electrical properties of the developer roll assist in the electrostatic transfer of the charged toner from the roll surface to the photoconductor drum. Examplary compositions and properties of conventional developer rolls are disclosed in detail in U.S. Pat. No. 5,707,743 to Janes et al., U.S. Pat. No. 5,804,114 to Janes et al., U.S. Pat. No. 5,874,172 to Beach et al. and U.S. Pat. No. 6,117,557 to Massie II, et al., all of which are herein incorporated by reference. These prior art patents relate to rolls with high surface resistance, processes of manufacturing high surface resistance rolls involving the oxidation of polybutadiene in the presence of ferric chloride, antioxidant agent components, and the desirability of caprolactone ester polyurethane developer rolls, respectively. These patents also disclose the print performance advantages and electrical properties of two-layered developer rolls and techniques for production of semiconductive rolls in general, and the particular techniques for the production of the resistive surface layer characteristic of the present inventive rolls.

Typically, plasticizers are used to reduce the hardness of polymeric elastomers such as cast urethanes. However, plasticizing additives, which are not chemically bonded into the polymer matrix, and are therefore free to migrate throughout the roll, including to the surface, may cause problems in electrophotographic print applications. At the surface of the developer roll, these migrating additives interact with the toner particles, causing the toner particles to undesirably coalesce on the surface of the developer roll.

It is known in the polyurethane art that addition of polyols to a polyurethane mixture may lower the hardness of the final polyurethane elastomer. However, these polyols typically result in not only a decrease in hardness, but also concomitant undesirable changes in other physical properties of the elastomer.

A common technique to produce a semi-conductive roll with a resistive layer is to prepare a core using any standard rubber molding technique, such as casting liquid urethanes or rubber transfer molding. The core is then ground to the correct dimensions and either spray or dip coated with a resistive material to the desired thickness. The coating is usually applied in several layers to build up the desired thickness. The production of such rolls suffers from higher process costs and defects which are typical problems with such methods of manufacturing a roll having a high resistive layer.

Hence, it is desirable to provide an elastomer roll exhibiting acceptable hardness via means that do not involve additives with the potential to migrate, and which do not cause unacceptable changes in other physical properties. In addition, it would be advantageous to provide a roll which eliminates non-uniformities in print performance caused by geometry reduction of the roll.

SUMMARY OF THE INVENTION

Accordingly, it is an object of the present invention to provide novel rolls and methods which overcome disadvantages of the prior art.

In one aspect of the present invention, rolls are provided. The rolls comprise a polyurethane elastomer formed from a polyurethane mixture, wherein the polyurethane mixture comprises polydiene, tri-functional polyol curative, an additional polymer curative having a molecular weight at least about 800 and comprising diol, polyol, diamine, polyamine or a combination thereof, conductive modifier, hydrolytic stabilizer, and, optionally, antioxidant.

In accordance with another aspect of the present invention, the methods for manufacturing rolls comprise casting a polyurethane mixture into a mold, wherein the polyurethane mixture comprises polydiene, tri-functional polyol curative, an additional polymer curative having a molecular weight of at least about 800 and comprising diol, polyol, diamine, polyamine or a mixture thereof, conductive modifier, hydrolytic stabilizer, and, optionally, antioxidant; curing the polyurethane mixture to allow demolding of a resulting roll; demolding the roll and, optionally, post-curing the demolded roll; grinding the roll to desired dimensions; and baking the roll under conditions sufficient to oxidize an outer layer of the roll.

The rolls and methods of the present invention may advantageously be used, for example, in image forming devices. The rolls exhibit a desirable combination of the hardness, compression set and electrical resistivity required by reduced-geometry devices, for example, electrophotographic printers, such that print quality is maintained. In addition, the inventive rolls and methods for manufacturing such rolls, may be used in any application wherein nip force must be reduced without adversely affecting the final printed product. These rolls are particularly advantageous in 2-component cartridge systems where variability in nip pressure is now reduced. These, and additional aspects, embodiments and advantages are disclosed in further detail in the following detailed description.

DETAILED DESCRIPTION

The present inventive rolls and methods for manufacturing the rolls comprise the use of polymer curatives in forming a polyurethane elastomer. In one embodiment, the polymer curative is cured to the polyurethane network to soften the polyurethane elastomer while maintaining the elastomer's low compression set.

The polyurethane elastomer hardness is measured according to ASTM D2240-86 in Shore A. Generally, compression set reflects the degree to which an elastomer fails to recover from a standard percent compression, once the given compressive force is released. Compression set herein is measured according to ASTM D395-89 using method B, wherein a compressive force is applied to the elastomer causing it to compress 25% of its original height for a period of about 22 hours at about 70° C. The compressive force is released after a standardized time under standardized conditions, and the elastomer is given a chance to restore or recover to its original height.

One embodiment of the inventive polyurethane rolls is as a developer roll for image forming devices, for example, in an electrophotographic printing application. The combination of hardness and compression set exhibited by the inventive rolls allows more uniform toner distribution during the functional life of such printers. This embodiment is particularly advantageous in reduced-geometry printers requiring reduced diameter rolls because it allows for decreasing the pressures at the developer roll interfaces with other components. One skilled in the art will appreciate additional image forming device applications for the rolls according to the invention.

It was discovered that reducing the geometry of the developer roll utilized in conventional electrophotographic print devices resulted in unacceptable print performance. Developer roll compliance (softness) is an important factor in achieving acceptable print performance. The developer roll and the photoconducting drum must maintain nip contact pressure within specific limits. If the contact pressure is too low, there is a resultant loss of image on the final printed page, resulting in a phenomena known in the industry as "white gapping." If the contact pressure is too high, poor print quality results, manifest as an increase in "graininess."

There are many potential sources of nip pressure variability, for example: spring force variation, radial lags in developer drive coupling, toner supply roll friction, axial locator friction, and developer weight change as toner supply decreases. These variables are familiar to one skilled in the printer arts. Nip pressure control via the composition of the roll is even more important in particular designs, such as two piece cartridge designs, wherein assembly line screening of component set-up is not practical. Several roll parameters can be manipulated to alter the nip pressure. For example, it was found that a larger nip width (the footprint at a contact point) reduces graininess. Hence, a lower nip pressure, all other factors being held constant, yields less graininess in the final printed product. The peak contact pressure, which results from a combination of the nip force and nip width, is impacted by the compliance, and therefore composition, of the developer roll.

In decreasing the geometry of the printer and printer components, the pressure at the nip increased and the aforementioned unacceptable print variation problems were observed. The need arose for a softer, more compliant developer roll in order to keep the nip pressure within acceptable limits. Hence, it is desirable to have a developer roll that is softer and more compliant such that it is less susceptible to manifesting printing performance variations and non-uniformities due to unacceptable nip pressure at the developer roll-doctor blade and developer roll-photoconducting drum interfaces.

In one embodiment, the inventive rolls comprise a polyurethane elastomer formed from a polyurethane mixture. As used herein, polyurethane mixture refers to the combination of components from which the polyurethane elastomer is formed by curing. Thus, the polyurethane mixture comprises the combination of components in substantially uncured form. The polyurethane mixture comprises polydiene, trifunctional polyol curative, an additional polymer curative having a molecular weight of at least about 800 and comprising diol, polyol, diamine, polyamine or a combination thereof, conductive modifier, hydrolytic stabilizer, and, optionally, antioxidant. Moreover, the polyurethane mixture can further comprise a urethane prepolymer. Molecular weight is defined as the number average molecular weight (hereinafter referred to as $M_n$, or simply molecular weight). In one embodiment for forming the roll, the polyurethane mixture is cast into a mold and cured. In one particular embodiment, the mold may include a shaft. The polyurethane mixture is cured under conditions sufficient to allow demolding of the resulting roll. Once demolded, the roll may be further processed, for example, with additional optional curing, then grinding to the required functional dimensions, and then baking at an elevated temperature, for example, greater than 80° C., to oxidize the outer layer of the roll. This controlled oxidation produces a high resistive layer on the outer layer of the roll, such that the outer layer on the roll has a resistivity, for example, of from about $5.0 \times 10^9$ ohm-cm to about $2.0 \times 10^{12}$ ohm-cm.

In one exemplary embodiment of the present invention, the type of urethane prepolymer added to the polyurethane mixture may comprise polyether, polyester, or polycaprolactone prepolymer with various isocyanate termination. For example, Versathane® PHP70A, which is a polyether type urethane prepolymer, Versathane® A-7QM which is a polyester type urethane prepolymer, both produced by Air Products, and Vibrathane® 6060, which is a polycaprolactone type urethane prepolymer, produced by Crompton Uniroyal Chemical Co., can all be used. More specifically, in another embodiment, polycaprolactone toluene-diisocyante prepolymer, such as Vibrathane® 6060 is added to the polyurethane mixture because of its stable electrical resistivity with temperature and humidity changes. Other polycaprolactone type urethane prepolymers can also be used, for example, the urethane prepolymers having caprolactone based polyester moieties, as disclosed in referenced U.S. Pat. No. 6,117,557, which is herein incorporated by reference, can be used.

In one embodiment, polydiene can be added to the polyurethane mixture in either diol or prepolymer form. In one embodiment, the polyurethane mixture includes polydiene diol or polydiene prepolymer. In another specific embodiment of the invention, the polydiene diol comprises polybutadiene diol, which is a highly resistive material. The polybutadiene diol can provide the polyurethane elastomer from which a developer roll is comprised with a high resistive outer layer. In one particular embodiment, the polybutadiene diol can be Poly Bd® R-45HT, produced by Sartomer Co., which has a $M_n$ of about 2,800 and a microstructure of 20% cis-1,4-polybutadiene, 60% trans-1,4-polybutadiene and 20% 1,2-vinyl-polybutadiene.

In one embodiment, the polydiene can be blended with the urethane prepolymer in various proportions. For example, typical urethane prepolymer/polydiene blend ratios range from about 95/5 parts by weight to about 60/40 parts by weight.

In one embodiment, the tri-functional polyol curative can be a polyether triol, such as Simulsol TOIE® produced by SEPPIC or Polyol TP 30 LW produced by Perstorp AB. The tri-functional polyol curative can be used to cure the blend of urethane prepolymer with the polydiene. For example, in one embodiment, the urethane prepolymer, such as the polycaprolactone type urethane prepolymer, can be cured by using a combination of a polybutadiene diol and a tri-functional polyol curative such as Simulsol TOIE® or Polyol TP 30 LW.

In one embodiment, the additional graft polymer curative, is a diol, polyol, diamine, or polyamine curative, or a combination thereof, and can be added to the polyurethane mixture in order to provide a polyurethane elastomer which has a desirably low hardness value. One skilled in the art can appreciate that polyol and polyamine can include triol and triamine materials, and materials of greater functionality. The hydroxyl-terminated and amine-terminated curatives suitable for use herein have a functionality of at least two with a $M_n$ of at least about 800. The additional polymer curatives extend the molecular chain length of the soft segment of the polyurethane elastomer, which in turn reduces the hard segment concentration of the polyurethane elastomer, thus contributing to a lower hardness value.

In a more specific embodiment, the additional graft polymer curative, included in the polyurethane mixture, is comprised of a low $M_n$ main chain and a high $M_n$ side chain. The main chain is the diol-terminated portion, and the side chain is the grafted portion. The diols on the polymer curative provide the active hydrogens for reacting with the urethane prepolymers in the polyurethane mixture to form the final polyurethane elastomer product. The grafted portion may comprise side chains such as polyether, polyester, silicone or polyacrylate. More particular, in one exemplary embodiment, the acrylate side chain can comprise poly n-butylacrylate. In further embodiments of the present invention involving the roll, the additional graft polymer curative has a $M_n$ of at least about 800. The graft polymer curative also has a relatively low $M_n$ main chain, defined as having a $M_n$ of less than about 200. In one embodiment, the graft polymer curative comprises a high $M_n$ side chain, defined as having a $M_n$ of at least about 600. In a more specific embodiment, the high $M_n$ side chain has a $M_n$ of from about 600 to about 25,000, and in an even more specific embodiment, the high $M_n$ side chain has a $M_n$ of from about 1000 to about 10,000. Embodiments directed to polyurethane elastomers and the manufacture of such polyurethane elastomers employ the polymer curatives as described.

Exemplary graft and non-graft polymer curatives that can be added to the polyurethane mixture include, polycaprolactone diols, such as TONE® 0260, produced by Union Carbide Corp., polyether diols or triols, such as Voranol® 5815, produced by Dow Chemical Co., Poly-G VHP® 55-37 or Poly-G VHP® 85-29 from Olin Chemical Corp. and Pluracol® 380 from BASF, polyester diols, such as Fomrez® 11-36 or Fomrez® 55-56 produced by Witco Corp., aliphatic-polycarbonate diols and polyols, such as UH-Carb300 from Ube Industries, polydimethylsiloxane diols, such as FM-4411 from Chisso Corp., polydimethylsiloxane diamines, such as FM-3311 or FM-3321 from Chisso Corp., graft polyols, such as silicone graft polyols, like, FM-DA11 or FM-DA21 from Chisso Corp., and acrylic graft polyols, such as those disclosed in Lexmark Docket No. 2002-0785.00, entitled, "Graft Polymer Curatives and Polyurethanes Formed Therefrom," which is herein incorporated by reference. These curatives have a $M_n$ of at least 800 and serve as chain extenders for the polyurethane elastomer which is formed by the polyurethane mixture.

In one particular embodiment, the additional polymer curative comprises from about 2% by weight to about 40% by weight of the polyurethane mixture. In a more specific embodiment, the additional polymer curative comprises from about 5 weight percent to about 25 weight percent of the polyurethane mixture.

In one embodiment, a conductive modifier can be added to the polyurethane mixture to reduce the resistivity of the polyurethane elastomer. In one particular embodiment, the conductive modifier comprises ferric chloride. Other conductive modifiers, such as ferrous chloride, calcium chloride and cobalt hexafluoroacetylacetonate are suitable alternatives to the ferric chloride. In a more specific embodiment, the conductive modifier can be added to the polyurethane mixture to reduce the blend bulk resistivity to less than about $1 \times 10^9$ ohm-cm. In order to achieve desirable resistivity values for the polyurethane elastomer, typical concentrations of conductive modifier range from about 0.05 to about 0.50 parts by weight per hundred parts by weight polyurethane elastomer, more specifically about 0.100 to about 0.300 parts by weight per hundred parts by weight polyurethane prepolymer.

In one embodiment, an antioxidant can be added to the polyurethane mixture, for example, to control the oxidative nature associated with the roll. In one embodiment, the antioxidant comprises a substituted phenol, for example, 2,6-di-tertiarybutyl-4-methyl-phenol (BHT), or other suitable substituted antioxidant material. Although to achieve desirable effects, typical amounts of antioxidant can vary, in one particular embodiment, about 3000 parts per million have been shown to be effective in controlling the oxidative aging of the roll. One skilled in the art will appreciate that additional antioxidants are available and suitable for use herein.

It is not uncommon for an office environment to have a high humidity and for a printer, particularly a developer roll inside a printer, to be exposed to a high operating temperature, for example, greater than 40° C. Polyurethane can degrade when exposed to a high level of moisture such as 80% relative humidity for a prolonged period of time and high temperature can accelerate the degradation of polyurethane elastomers. Also, an acidic source, such as a conductive modifier like ferric chloride, will accelerate the degradation of the polyurethane elastomers. Degradation is defined as the loss in durometer hardness over time and is characterized herein as a loss in durometer hardness when exposed to a high temperature and high humidity environment such as 60° C. and 80% relative humidity for a specified period of time. Therefore, to offset such problematic conditions, the polyurethane mixture includes a hydrolytic stabilizer to maintain the roll's physical and electrical properties over a long period of time and at various environmental conditions. In one particular embodiment, the hydrolytic stabilizer is triisopropanolamine (TIPA). The amount of TIPA added to the polyurethane mixture is functionally low such that it does not effectively influence the electrical properties of the roll. Other hydrolytic stabilizers are known in the art and are suitable for use herein, with the selection thereof being within the ability of one of ordinary skill in the art.

Typical rolls comprised of polyurethane elastomers exhibit a hardness ranging from 40-60 Shore A (measured by ASTM D2240), with the use of a plasticizer, which may be detrimental to the photoconductor drum material. However, without the use of a plasticizer, the hardness of the roll becomes significantly high. Without the use of a plasticizer, high molecular weight polyols can be used to achieve this hardness range, however, this approach leads to a substantial increase in compression set or a decrease in the resistive layer of the roll. In one embodiment, the inventive rolls comprised of the polyurethane elastomers as described above exhibit a hardness of less than about 50 Shore A, while maintaining a compression set of less than about 8%. In a particular embodiment, the roll comprised of the inventive polyurethane elastomer exhibits hardness of less than about 43 Shore A and has a compression set of less than about 5%, which achieves desirable properties such as uniform printing performance.

In one exemplary embodiment, the inventive methods for manufacturing rolls comprise casting a polyurethane mixture into a mold, wherein the polyurethane mixture comprises urethane prepolymer, polydiene, tri-functional polyol curative, an additional polymer curative having a $M_n$ of at least about 800 and comprising diol, polyol, diamine, polyamine or a combination thereof, conductive modifier, hydrolytic stabilizer, and, optionally, antioxidant; curing the polyurethane mixture to allow demolding of a resulting roll; demolding the roll and, optionally, post-curing the demolded roll; grinding the roll to desired dimensions; and baking the roll under conditions sufficient to oxidize an outer layer of the roll. In one embodiment, the outer layer of the roll has a resistivity from about $5.0 \times 10^9$ ohm-cm to about $2.0 \times 10^{12}$ ohm-cm.

In one embodiment, the polyurethane mixture is cast into a mold around a central, metal shaft.

In one exemplary embodiment, the polyurethane mixture is cured at a temperature from about 90° C. to about 120° C. by using a combination of mold curing and post-curing for a total of about 6 hours to about 24 hours. The polyurethane mixture can be subjected to a temperature sufficiently high enough for curing, but one that will not cause thermal degradation of the polyurethane mixture. In a more specific embodiment the polyurethane mixture is cured at a temperature of about 100° C. for a total of 16 hours.

In one embodiment, the cured roll is ground to desired dimensions. Then, the roll is baked under conditions sufficient to oxidize the outer layer of the roll. In another embodiment, by baking the ground roll in air at an elevated temperature from about 80° C. to about 140° C. for anywhere from about 6 hours to days, the resistive layer on the outer layer of the roll is produced. Baking the roll oxidizes the polybutadiene diol or polydiene prepolymer that is included in the polyurethane mixture. Polybutadiene diol or polydiene prepolymer is highly unsaturated such that it is very susceptible to oxidation. The presence of a conductive modifier, for example, ferric chloride, catalyzes this oxidation. The thickness and electrical resistivity of the outer layer can be controlled by varying the concentration of ferric chloride, polybutadiene diol or prepolymer, the baking temperature, the level of oxygen, and baking time.

The resistivity level of the outer layer of the rolls can be measured using the following exemplary embodiment. A conductive media such as conductive carbon paint or tape is applied in about an 8-mm strip down the roll. A circuit is made by making electrical contact with the conductive carbon tape and the roll shaft. The direct current resistivity of the roll at about 100 volts, the time constant, and the alternating current resistivity of the roll at 1 kHz are measured. The time constant is measured by applying a 100 volt bias to the roll, removing the voltage, then measuring the time for the voltage on the roll to decay to about 1/e (or about 37%) of its original value. This time constant is related to the resistivity and thickness of the outer layer of the roll. The roll can be modeled as two parallel RC circuits in series. One RC circuit represents the core and the second represents the resistive surface layer. In one embodiment, the following model was applied in calculating the time constant.

$$\tau = R*C = \rho_c * K_c * \epsilon_o$$

$$\rho_c = \tau/(K_c * \epsilon_o)$$

$$Tc = 10{,}000(R*A/\rho_c)$$

$$\rho_b = R_b*(A/T)$$

where, $\tau$=time constant (sec)

$\rho_c$=resistivity of resistive outer layer (ohm-cm)

C=capacitance (farad)

$K_c$=dielectric constant of material $\epsilon_o$=permittivity of free space=$8.85 \times 10^{-12}$ $C^2/N\ m^2$=$8.85 \times 10^{-14}$ F/cm Tc=thickness of resistive outer layer (μm)

R=roll DC resistance (ohm)

A=surface area of the electrical measurement of the roll ($cm^2$)

T=thickness of bulk rubber layer (cm)

$R_b$=roll AC resistance (ohm) @ 1 kHz $\rho_b$=bulk resistivity (ohm-cm)

The resistivity and thickness of the outer layer of the roll can be calculated from the time constant and DC resistance measurements. The dielectric constant of the coating is assumed to be 10, a typical value for a polyurethane elastomer. In one embodiment, the desired electrical properties of the roll include a bulk resistivity less than about $1.0 \times 10^9$ ohm-cm, outer layer resistivity from about $5.0 \times 10^9$ ohm-cm to about $2.0 \times 10^{12}$ ohm-cm, a coating thickness from about 30 μm to about 200 μm, and the time constant from about 5 to about 2000 milliseconds (ms), all measured at 22° C. and 50% relative humidity. In another embodiment, the bulk resistivity is less than about $3.0 \times 10^8$ ohm-cm, the outer layer resistivity is about $1.0 \times 10^{11}$ ohm-cm, the outer layer thickness is about 100 μm, and the time constant is about 100 ms.

EXAMPLES 1-10

Examples 2-10 are intended to be illustrative of polyurethane mixtures which form embodiments of the inventive rolls and methods of manufacturing the rolls comprising polyurethane elastomers, while Example 1, the control, serves as a comparative formulation. These examples should not be construed to limit the scope of either the inventive rolls or methods, including the polyurethane mixture, or more particularly the polymer curatives. These sample formulations are summarized below, including oxidative treatment for forming a resistive outer layer, and physical property characteristics of rolls produced therefrom are illustrated in Table 1.

Formulations:

Example 1

| Ingredient | Percent by Weight of PU mixture |
|---|---|
| Polycaprolactone urethane prepolymer | 82.75 |
| Polybutadiene diol | 12.00 |
| Polyether triol | 4.66 |
| Conductive modifier | 0.17 |
| Antioxidant | 0.33 |
| Hydrolytic stabilizer | 0.10 |
| Total | 100.00 |

Oxidative bake process: 12 hours at 100° C.

Example 2

| Ingredient | Percent by Weight of PU mixture |
|---|---|
| Polycaprolactone urethane prepolymer | 63.50 |
| Polybutadiene diol | 12.00 |
| Polyether triol | 2.15 |
| Polyether diol (e.g., Poly-G VHP ® diol) | 22.14 |
| Conductive modifier | 0.13 |
| Hydrolytic stabilizer | 0.08 |
| Total | 100.00 |

Oxidative bake process: 7 hours at 90° C.

Example 3

| Ingredient | Percent by Weight of PU mixture |
|---|---|
| Polycaprolactone urethane prepolymer | 62.76 |
| Polybutadiene diol | 25.00 |
| Polyether triol | 1.76 |
| Polyether diol (e.g., Poly-G VHP ® diol) | 9.95 |
| Conductive modifier | 0.20 |
| Antioxidant | 0.25 |
| Hydrolytic stabilizer | 0.08 |
| Total | 100.00 |

Oxidative bake process: 12 hours at 100° C.

Example 4

| Ingredient | Percent by Weight of PU mixture |
|---|---|
| Polycaprolactone urethane prepolymer | 63.80 |
| Polybutadiene diol | 12.00 |
| Polyether triol | 1.34 |
| Polyester diol (e.g., Fomrez ® diol) | 22.36 |
| Conductive modifier | 0.16 |
| Antioxidant | 0.26 |
| Hydrolytic stabilizer | 0.09 |
| Total | 100.00 |

Oxidative bake process: 10 hours at 100° C.

Example 5

| Ingredient | Percent by Weight of PU mixture |
|---|---|
| Polycaprolactone urethane prepolymer | 73.04 |
| Polybutadiene diol | 12.00 |
| Polyether triol | 2.32 |
| Polydimethylsiloxane diol (e.g., FM-DA11 diol) | 12.06 |
| Conductive modifier | 0.15 |
| Antioxidant | 0.33 |
| Hydrolytic stabilizer | 0.10 |
| Total | 100.00 |

Oxidative bake process: 8 hours at 100° C.

Example 6

| Ingredient | Percent by Weight of PU mixture |
|---|---|
| Polycaprolactone urethane prepolymer | 67.61 |
| Polybutadiene diol | 12.00 |
| Polyether triol | 2.98 |
| Polydimethylsiloxane diol (e.g., FM-DA21 diol) | 16.84 |
| Conductive modifier | 0.14 |
| Antioxidant | 0.33 |
| Hydrolytic stabilizer | 0.10 |
| Total | 100.00 |

Oxidative bake process: 12 hours at 100° C.

Example 7

| Ingredient | Percent by Weight of PU mixture |
|---|---|
| Polycaprolactone urethane prepolymer | 63.23 |
| Polybutadiene diol | 12.00 |
| Polyether triol | 2.48 |
| Polydimethylsiloxane diol (e.g., FM-DA21 diol) | 21.73 |

-continued

| Ingredient | Percent by Weight of PU mixture |
|---|---|
| Conductive Modifier | 0.13 |
| Antioxidant | 0.33 |
| Hydrolytic stabilizer | 0.11 |
| Total | 100.00 |

Oxidative bake process: 12 hours at 100° C.

Example 8

| Ingredient | Percent by Weight of PU mixture |
|---|---|
| Polyester urethane prepolymer | 79.71 |
| Polybutadiene diol (w/antioxidant) | 8.07 |
| Polyether triol | 2.79 |
| Polyether polyol (e.g., Pluracol ® polyol) | 9.05 |
| Conductive modifier | 0.176 |
| Hydrolytic stabilizer | 0.20 |
| Total | 100.00 |

Oxidative bake process: 10 hours at 100° C.

Example 9

| Ingredient | Percent by Weight of PU mixture |
|---|---|
| Polyether urethane prepolymer | 76.57 |
| Polybutadiene diol (w/antioxidant) | 12.35 |
| Polyether triol | 1.71 |
| Polyether polyol (e.g., Pluracol ® polyol) | 9.00 |
| Conductive modifier | 0.169 |
| Hydrolytic stabilizer | 0.20 |
| Total | 100.00 |

Oxidative bake process: 24 hours at 100° C.

Example 10

| Ingredient | Percent by Weight of PU mixture |
|---|---|
| Polycaprolactone urethane prepolymer | 65.09 |
| Polybutadiene diol (w/antioxidant) | 12.43 |
| Polyether triol | 2.24 |
| Aliphatic-polycarbonate polyol (e.g., UH-Carb300 polyol) | 20.00 |
| Conductive modifier | 0.13 |
| Hydrolytic stabilizer | 0.10 |
| Total | 100.00 |

Oxidative bake process: 24 hours at 100° C.

TABLE 1

Physical Properties of Example Formulations

| Example | Hardness[1] (Shore A) | Compression Set[2] | $\rho_c$ (ohm-cm) | Tc (μm) | $\rho_b$[3] (ohm-cm) |
|---|---|---|---|---|---|
| 1 | 60 | 3% | $2.6 \times 10^{11}$ | 90 | $1.0 \times 10^8$ |
| 2 | 49 | 2% | $2.4 \times 10^{10}$ | 198 | $5.1 \times 10^7$ |
| 3 | 49 | 10% | $1.4 \times 10^{11}$ | 128 | $6.5 \times 10^7$ |
| 4 | 51 | 7% | $1.5 \times 10^{11}$ | 120 | $1.0 \times 10^8$ |
| 5 | 46 | 4% | $6.9 \times 10^{10}$ | 96 | $8.9 \times 10^7$ |
| 6 | 47 | 4% | $1.2 \times 10^{11}$ | 144 | $1.3 \times 10^8$ |
| 7 | 44 | 4% | $1.4 \times 10^{11}$ | 153 | $1.5 \times 10^8$ |
| 8 | 40 | 4% | $6.1 \times 10^{10}$ | 122 | $1.7 \times 10^8$ |
| 9 | 41 | 3% | $8.1 \times 10^9$ | 66 | $2.7 \times 10^7$ |
| 10 | 51 | — | $8.9 \times 10^{11}$ | 107 | $2.7 \times 10^8$ |

[1]Hardness measured according to ASTM D2240-86
[2]Compression set measured according to ASTM D395-89; method B; exposed for about 22 hours at about 70° C.
[3]Bulk resistivity measured at 1 kHz As shown in Table 1, examples 2-10 exhibit advantageous polyurethane mixture formulations for forming polyurethane elastomers having low hardness and low compression set combinations. Particularly, examples 5-9 illustrate formulations having advantageous properties that can be used in various geometry-reducing applications, such as in developer rolls for image forming devices.

Also as indicated by Table 1, by increasing the polydiene concentration level, the resistivity of the outer layer can be increased. In addition, the exemplary embodiments illustrate that by reducing the conductive modifier concentration levels, this reduces the outer layer resistivity and increases the outer layer thickness.

While the invention has been described in detail with reference to specific embodiments thereof, it would be apparent to those skilled in the art that various changes and modifications may be made therein without departing from the spirit of the invention, the scope of which is defined by the following claims.

We claim:

1. A roll comprising a polyurethane elastomer formed from a polyurethane mixture, wherein the polyurethane mixture comprises urethane prepolymer, polydiene, tri-functional polyol curative, an additional graft polymer curative having a molecular weight of at least about 800 and comprising at least two hydroxy and/or amino groups, conductive modifier, hydrolytic stabilizer, and, optionally, antioxidant; wherein the additional graft polymer curative having the at least two hydroxy and/or amino groups comprises at least one acrylate, silicone or polyester side chain.

2. The roll according to claim 1, wherein the roll is a developer roll.

3. The roll according to claim 1, wherein the polydiene is polydiene diol or polydiene prepolymer.

4. The roll according to claim 1, wherein the urethane prepolymer comprises polycaprolactone ester toluene diisocyanate prepolymer.

5. The roll according to claim 3, wherein the polydiene diol comprises polybutadiene diol.

6. The roll according to claim 1, wherein the conductive modifier is selected from the group consisting of ferric chloride, ferrous chloride, calcium chloride, cobalt hexafluoroacetylacetonate and combinations thereof.

7. The roll according to claim 6, wherein the conductive modifier comprises ferric chloride.

8. The roll according to claim 1, wherein the hydrolytic stabilizer comprises triisopropanolamine.

9. The roll according to claim 1, exhibiting a Shore A hardness of less than about 50 according to ASTM D2240-86 and a compression set of less than about 8% according to ASTM D395-89, method B, at a temperature of about 70° C. for about 22 hours.

10. An image forming device comprising a roll as recited in claim 1.

11. The image forming device according to claim 10, wherein the image forming device comprises an electrophotographic printer.

12. The roll according to claim 1, wherein the additional graft polymer curative further comprises a polyether side chain.

13. A method of manufacturing a roll comprising:
   a) casting a polyurethane mixture into a mold, the polyurethane mixture comprising urethane prepolymer, polydiene, tri-functional polyol curative, from about 9% to about 40% by weight of an additional graft polymer curative having a molecular weight of at least about 800 and comprising at least two hydroxy and/or amino groups, conductive modifier, hydrolytic stabilizer, and, optionally, antioxidant,
   b) curing the polyurethane mixture to allow demolding of a resulting roll;
   c) demolding the roll and, optionally, post-curing the demolded roll;
   d) grinding the roll to desired dimensions; and
   e) baking the roll under conditions sufficient to oxidize an outer layer of the roll,
wherein the additional graft polymer curative having the at least two hydroxy and/or amino groups comprises at least one acrylate, silicone or polyester side chain.

14. The method according to claim 13, wherein the urethane prepolymer comprises polycaprolactone ester toluene diisocyanate prepolymer.

15. The method according to claim 13, wherein the polydiene is polydiene diol or polydiene prepolymer.

16. The method according to claim 15, wherein the polydiene diol comprises polybutadiene diol.

17. The method according to claim 13, wherein the conductive modifier is selected from the group consisting of ferric chloride, ferrous chloride, calcium chloride, cobalt hexafluoroacetylacetonate and combinations thereof.

18. The method according to claim 17, wherein the conductive modifier comprises ferric chloride.

19. The method according to claim 13, wherein the hydrolytic stabilizer comprises triisopropanolamine.

20. The method according to claim 13, wherein the antioxidant comprises 2,6-di-tertiarybutyl-4-methyl-phenol.

21. The method according to claim 13, wherein the roll has a hardness of less than about 50 Shore A according to ASTM D2240-86 and a compression set of less than or about 8% according to ASTM D395-89, method B, at a temperature of about 70° C. for about 22 hours.

22. The method according to claim 13, wherein the outer layer has a resistivity from about $5.0 \times 10^9$ ohm-cm to about $2.0 \times 10^{12}$ ohm-cm.

23. A developer roll for an image forming device, comprising a polyurethane elastomer formed from a polyurethane mixture, wherein the polyurethane mixture comprises polycaprolactone urethane prepolymer, polybutadiene diol, tri-functional polyol curative, a grafted polymer curative having two hydroxy groups and a silicone side chain, conductive modifier comprising ferric chloride, hydrolytic stabilizer comprising triisopropanolamine, and antioxidant comprising 2,6-di-tertiarybutyl-4-methyl-phenol, wherein the developer roll exhibits a Shore A hardness of less than about 50 according to ASTM D2240-86 and a compression set of less than about 5% according to ASTM D395-89, method B, at a temperature of about 70° C. for about 22 hours.

24. A method of manufacturing a roll, comprising:
   a) casting a polyurethane mixture into a mold, the polyurethane mixture comprising polycaprolactone urethane prepolymer, polybutadiene diol, tri-functional polyol curative, a grafted polymer curative having two hydroxy groups and a silicone side chain, conductive modifier comprising ferric chloride, hydrolytic stabilizer comprising triisopropanolamine, and antioxidant comprising 2,6-di-tertiarybutyl-4-methyl-phenol, wherein the developer roll exhibits a Shore A hardness of less than about 50 according to ASTM D2240-86 and a compression set of less than about 5% according to ASTM D395-89, method B, at a temperature of about 70° C. for about 22 hours,
   b) curing the polyurethane mixture to allow demolding of a resulting roll;
   c) demolding the roll and, optionally, post-curing the demolded roll;
   d) grinding the roll to desired dimensions; and
   e) baking the roll under conditions sufficient to oxidize an outer layer of the roll, wherein the outer layer has a resistivity from about $5.0 \times 10^9$ ohm-cm to about $2.0 \times 10^{12}$ ohm-cm.

* * * * *